(12) United States Patent
Christiano et al.

(10) Patent No.: US 11,577,442 B2
(45) Date of Patent: Feb. 14, 2023

(54) POLYMERIC TUBE FORMING APPARATUS WITH A MULTI-DIMENSIONAL CONTROL SYSTEM

(71) Applicant: Davis-Standard, LLC, Pawcatuck, CT (US)

(72) Inventors: John P. Christiano, Old Lyme, CT (US); Chad Allen Biron, Gloucester, MA (US); Alexandre MacGregor, Old Lyme, CT (US); Joseph A. Wnuk, Westerly, RI (US); Christopher Rosivach, Westerly, RI (US); Saulius T. Eiva, Ashaway, RI (US); Tyler Robert McKenna, Pawcatuck, CT (US)

(73) Assignee: DAVIS-STANDARD, LLC, Pawcatuck, CT (US)

(*) Notice: Subject to any disclaimer, the term of this patent is extended or adjusted under 35 U.S.C. 154(b) by 62 days.

(21) Appl. No.: 17/065,633

(22) Filed: Oct. 8, 2020

(65) Prior Publication Data
US 2021/0107203 A1   Apr. 15, 2021

Related U.S. Application Data

(60) Provisional application No. 62/912,898, filed on Oct. 9, 2019.

(51) Int. Cl.
*B29C 48/92* (2019.01)
*B29C 48/09* (2019.01)
*B29C 48/325* (2019.01)
*B29C 48/25* (2019.01)
*B29L 23/00* (2006.01)

(52) U.S. Cl.
CPC ............. *B29C 48/92* (2019.02); *B29C 48/09* (2019.02); *B29C 48/2522* (2019.02);
(Continued)

(58) Field of Classification Search
CPC ..... B29C 48/92; B29C 48/09; B29C 48/2522; B29C 48/325; B29C 2948/92152; B29C 2948/92647; B29L 2023/22
See application file for complete search history.

(56) References Cited

U.S. PATENT DOCUMENTS 3,209,404 A   10/1965   Hagen
3,221,372 A * 12/1965   Lieberman ............ B29C 48/919
                                                             425/467
(Continued)

FOREIGN PATENT DOCUMENTS

CN       205767428 U    12/2016
DE   102008061286 A1    6/2010
(Continued)

OTHER PUBLICATIONS

Extended European Search Report issued in corresponding EP Application No. 20200703.5, dated Mar. 5, 2021, pp. 1-8.
(Continued)

*Primary Examiner* — Galen H Hauth
(74) *Attorney, Agent, or Firm* — Robinson & Cole LLP

(57) ABSTRACT

A tube forming apparatus for forming polymeric tubing includes a housing between rear and discharge ends. The tube forming apparatus includes a core tube assembly with an exterior core tube and an inner core tube positioned partially therein and in an interior area of the housing. The tube forming apparatus includes a die that has an inner die-surface. A diverter tip is mounted in and extends from the inner core tube into the die forming a die opening between the die and the diverter tip. The tube forming apparatus includes a core tube adjustment system mounted proximate the rear end which includes an axial displacement device configured to axially position the core tube assembly for modulating wall thickness of the tube and/or an angular
(Continued)

displacement device configured to modulate the inner core tube for modulating concentricity of the tube.

15 Claims, 15 Drawing Sheets

(52) U.S. Cl.
CPC .. *B29C 48/325* (2019.02); *B29C 2948/92152* (2019.02); *B29C 2948/92647* (2019.02); *B29L 2023/22* (2013.01)

(56) References Cited

U.S. PATENT DOCUMENTS 3,386,132 A * 6/1968 Fischer ................ B29C 48/475
425/192 R 3,923,439 A * 12/1975 Isley ...................... B29C 48/34
425/150
5,120,212 A    6/1992 Reiber et al.
5,206,032 A *  4/1993 Bock ...................... B29C 48/32
425/523

FOREIGN PATENT DOCUMENTS

WO    9739872  A1   10/1997
WO    0226470  A1    4/2002

OTHER PUBLICATIONS

CN Office Action issued in corresponding CN Application No. 202011072626.5, dated Aug. 10, 2022. pp. 1-11.

* cited by examiner

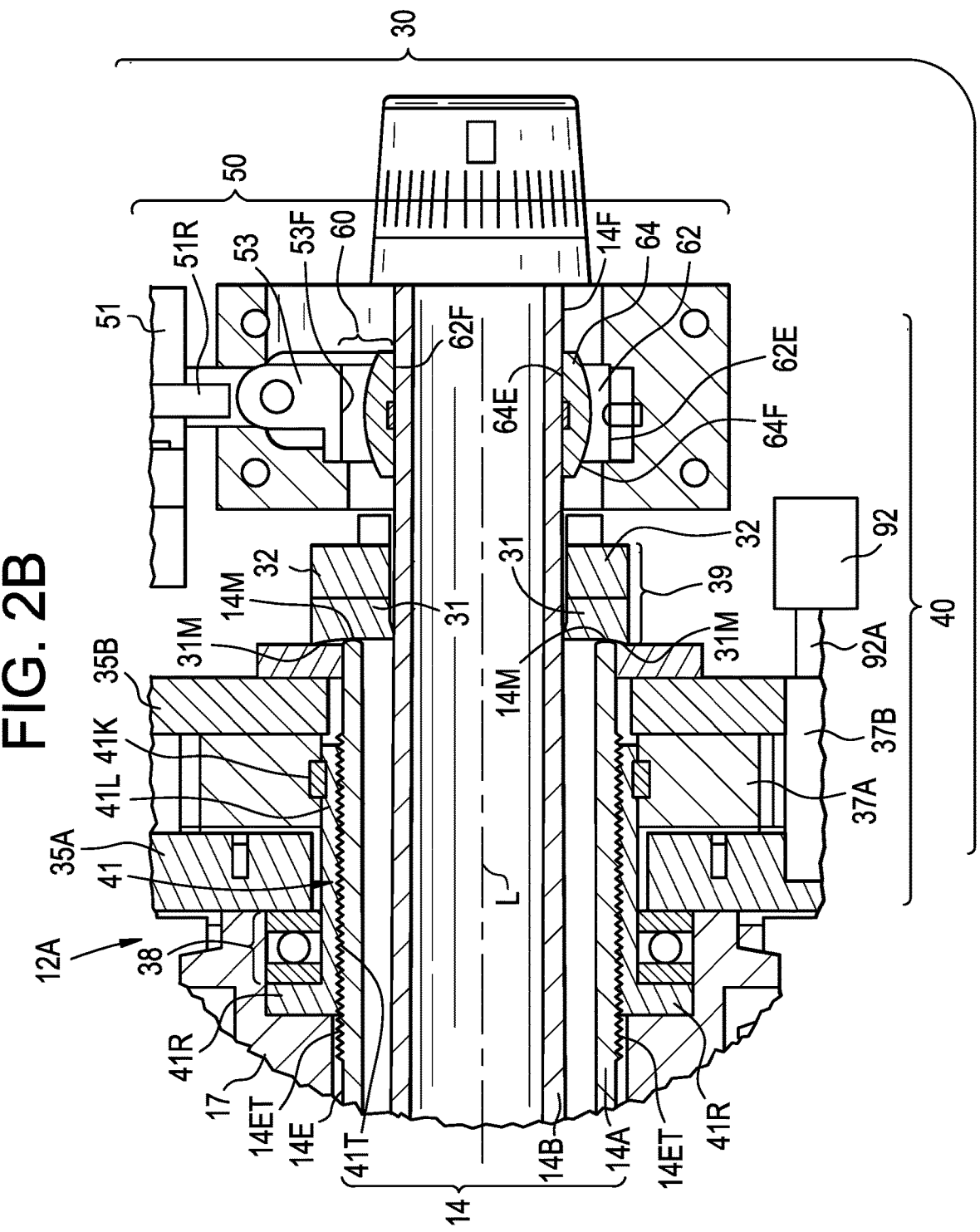

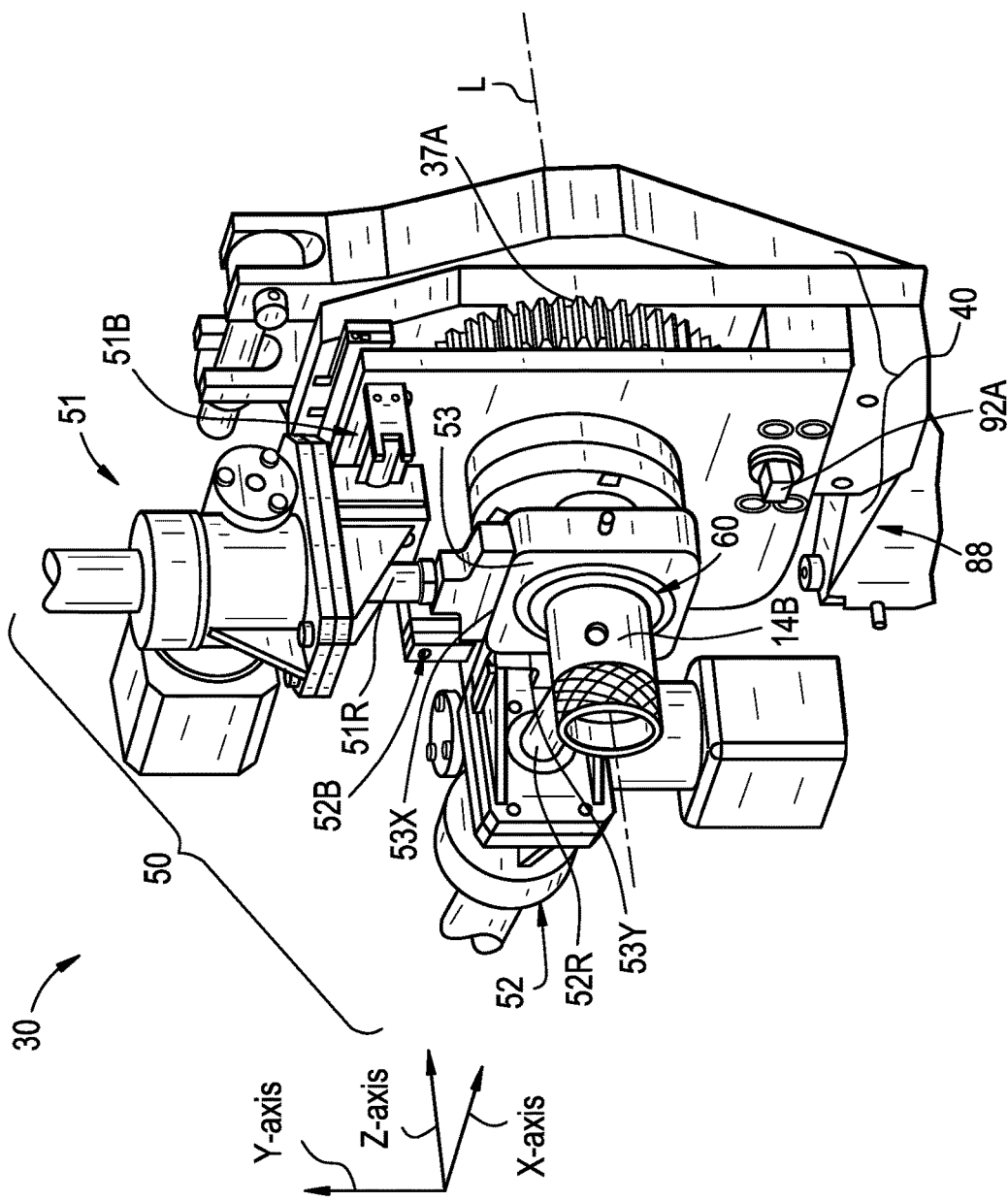

Before

After

POLYMERIC TUBE FORMING APPARATUS WITH A MULTI-DIMENSIONAL CONTROL SYSTEM

CROSS REFERENCE TO RELATED APPLICATION

This application claims the benefit of U.S. Provisional Patent Application Ser. No. 62/912,898 filed on Oct. 9, 2019, which is incorporated herein by reference in its entirety.

FIELD OF THE INVENTION

The present invention relates generally to an apparatus for forming polymeric tube and more particularly to an apparatus for forming polymeric tube having a modulation system for multi-dimensional control of polymeric tube wall thickness and concentricity.

BACKGROUND OF THE INVENTION

As shown in FIG. 1, a prior art tube forming apparatus is designated by element number 100. The tube forming apparatus 100 includes a housing 112 with a core tube 114 disposed therein. The core tube 114 includes a tip 116 for forming the inside diameter D10 of a tube 120. A die assembly 118 is positioned in a discharge section of the housing 112. An annular die bushing 118B is positioned in the die assembly 118. The tip 116 is positioned in the die bushing 118B and an annular die opening G1 is formed between the tip 116 and an inside surface of the die bushing 118B. The die opening G1 is often referred to as a gum space. Molten material, such as a polymeric material, is fed into the housing 112 via an inlet 124, flows in the housing 112 via flow passage FP around the mandrel 117 and tip 116, and is discharged from the die assembly 118 through the die opening G1 in the form of a hollow tube 120 having an outside diameter D21, an inside diameter D10 and a wall thickness T1. The flow passage FP is configured to create a flow distribution for a predetermined range of extrusion rates and multiple different polymeric materials.

The wall thickness T1 and concentricity of the tube 120 discharged from the die assembly 118 is difficult to control. Typical prior art tube forming apparatuses 100 required manual positioning of the die bushing 118B relative to the tip 116 to adjust the size of the die opening G1 which controls the wall thickness T1 and concentricity of the tube 120. Such adjustments of the die opening G1 are typically accomplished by manually turning adjusting screws 122 that are threaded into the housing 112 and are configured to move the die bushing 118B relative to the tip 116. Using the measurements, the adjustments of the die opening G1 are typically performed while the prior art tube forming apparatus 100 is shut down. The adjustments of the die bushing 118B to establish appropriate the wall thickness and concentricity of the tube 120 using the prior art tube forming apparatus 100 is a time consuming iterative process that results in production of material that does not meet specifications and results in a significant waste of material.

Attempts have been made to automate adjustment of the die opening G1. However, such attempts resulted in an overly complex system that required additional maintenance and components and required additional space to accommodate such additional components.

Thus, there is a need for an automated system to modulate tube wall thickness and concentricity, to address the foregoing problems.

SUMMARY OF THE INVENTION

The present invention is directed to a tube forming apparatus for multi-dimensional controlled forming of polymeric tube. The tube forming apparatus includes a housing that extends around a longitudinal axis and between a rear end and a discharge end thereof. The housing has an inside surface that extends between the rear end and the discharge end. The inside surface forms an interior area inside the housing. The tube forming apparatus includes a core tube assembly that has an exterior core tube which extends between a pivot end and a tip engagement end thereof. The exterior core tube extending into the interior area such that the tip engagement end is located proximate the discharge end of the housing and the mounting section is located proximate the rear end of the housing. The tube forming apparatus includes an inner core tube that extends between a first inner tube end and a second inner tube end. The first inner tube end is disposed in the exterior core tube and the second inner tube end extends out of the exterior core tube. The tube forming apparatus includes a die that is in fixed relation to the housing and has an inner die-surface. The tube forming apparatus includes a diverter tip that is mounted in and extends from the first inner tube end. The diverter tip has an exterior tip-surface thereon. The diverter tip extends into the die such that a die opening is formed between the inner die-surface and the exterior tip-surface. The tube forming apparatus includes a core tube adjustment system that is mounted proximate the rear end of the housing. The core tube adjustment system includes one or both of an axial displacement device configured to axially position the core tube assembly for modulating wall thickness of the tube being discharged from the die opening; and an angular displacement device configured to modulate the inner core tube, relative to the longitudinal axis, for modulating concentricity of the tube being discharged from the die opening.

In some embodiments, the core tube adjustment system includes one or more servo motor.

In some embodiments, the axial displacement device is configured to accomplish the axially positioning the core tube assembly automatically during operation of the tube forming apparatus.

In some embodiments, the angular displacement device is configured to accomplish the modulating of the inner core tube automatically during operation of the tube forming apparatus.

In some embodiments, the tube forming apparatus includes a sensor system that includes one or both of a tube wall thickness sensor system configured to measure wall thickness of the tube and to generate tube wall thickness signals; and a tube concentricity sensor system configured to measure concentricity of the tube and to generate tube concentricity signals. The tube forming system includes a control system in communication with the core tube adjustment system. The control system includes a computer processor configured with executable software. The computer processor is configured to receive the signals (e.g., tube wall thickness signals, tube inside diameter signals, and tube outside diameter signals) and/or the concentricity signals. The executable software is configured to analyze the signals and/or the concentricity signals and to control the tube adjustment system to automatically modulate wall thickness and concentricity of the tube.

In some embodiments, tube forming apparatus includes a thrust bearing in communication with the exterior core tube and the housing to facilitate the accomplishing of the axially positioning the core tube assembly during operation of the tube forming apparatus.

In some embodiments, the axial displacement device includes a drive thread on the exterior surface of the exterior core tube and a gear arrangement in communication with the drive thread such that operation of the gear arrangement causes axial movement of the core tube assembly.

In some embodiments, the diverter tip has a spherical exterior sleeve surface and the tip engagement end of the exterior core tube has a spherical inner engagement surface that slidingly engages the exterior sleeve surface in response to modulating of the inner core tube relative to the exterior core tube.

In some embodiments, tube forming apparatus includes a spherical bearing that has an outer member positioned around an inner member. The outer member has a cylindrical outer surface and a spherical inner bearing surface. The inner member has a spherical outer bearing surface and a cylindrical inner surface. The exterior surface of the exterior core tube is in sliding engagement with the cylindrical inner surface of the inner member.

In some embodiments, the inner core tube is angularly modulatable relative to the exterior tube.

In some embodiments, the angular displacement device includes a first actuator that is configured to modulate the inner core tube in a first radial direction (Y-axis) and a second actuator that is configured to modulate the inner core tube in a second radial direction (X-axis) that is perpendicular to the first radial direction (Y-axis), such that cooperation of the first actuator and the second actuator enables modulating of the inner core tube in around the longitudinal axis.

In some embodiments, the axial displacement device is configured to axially move the core tube assembly via communication with the exterior core tube.

In some embodiments, the inner core tube is in fixed axial relation to the exterior core tube via a locking assembly that includes a bushing and a lock nut that are threaded onto the inner core tube such that the inner core tube is axially fixed between the bushing and a spherical exterior sleeve surface of the diverter tip. An axial face of the bushing is in angular sliding engagement with the pivot end of the exterior core tube. In some embodiments, the axial face 31M has a spherical contour.

In some embodiments, a wear resistant coating is applied to the inner die-surface, the exterior tip-surface, and/or the inner bushing-surface. In some embodiments, the wear resistant coating is a chromium based material.

In some embodiments, the mandrel assembly has a tapered area configured to facilitate installation and removal of the mandrel assembly to and from the housing.

In some embodiments, the flow passage creates a uniform flow distribution and uniform wall thickness of the tube for a predetermined range of extrusion rates and multiple different polymeric materials.

In some embodiments, the tube forming apparatus also includes a first linear bearing and a second linear bearing. The first linear bearing is between the housing and the first actuator to facilitate movement of the first actuator relative to the housing in the second radial direction (X-axis). The second linear bearing is between the housing and the second actuator to facilitate movement of the second actuator relative to the housing in the first radial direction (Y-axis).

The present invention includes, a core tube assembly that includes an exterior core tube and an inner core tube. The exterior core tube extends between a pivot end and a tip engagement end thereof. The exterior core tube extends into the interior area such that the tip engagement end is located proximate the discharge end of the housing and the mounting section is located proximate the rear end of the housing. The core tube assembly includes an inner core tube that extends between a first inner tube end and a second inner tube end. The first inner tube end is disposed in the exterior core tube and the second inner tube end extends out of the exterior core tube. A diverter tip is mounted in and extends from the first inner tube end. The diverter tip has an exterior tip-surface thereon and a spherical exterior sleeve surface that extends axially inward from the exterior tip-surface. The tip engagement end of the exterior core tube has a spherical inner engagement surface that slidingly engages the exterior sleeve surface. The inner core tube is in fixed axial relation to the exterior core tube via a locking assembly that includes a bushing and a lock nut that are threaded onto the inner core tube such that the inner core tube is axially fixed between the bushing and a spherical exterior sleeve surface of the diverter tip. An axial face of the bushing is in angular sliding engagement with the pivot end of the exterior core tube.

BRIEF DESCRIPTION OF THE DRAWINGS

FIG. 2B is an enlarged view of detail 2B of FIG. 2A;

FIG. 4B is another perspective view of the tube forming apparatus of FIG. 3;

DETAILED DESCRIPTION

Figure 1:
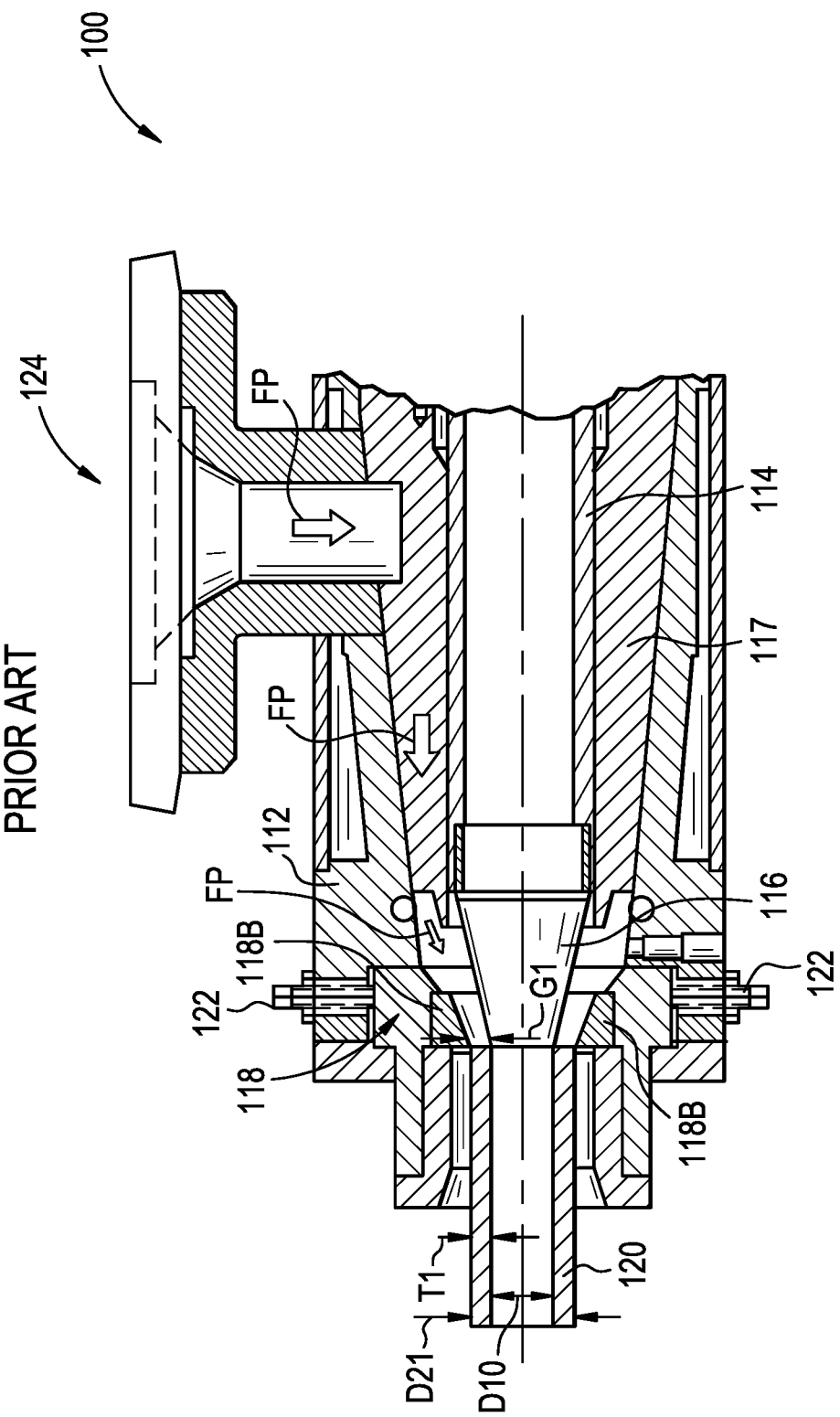
FIG. 1 is a top cross sectional view of a prior art tube forming apparatus.
Figure 2A:
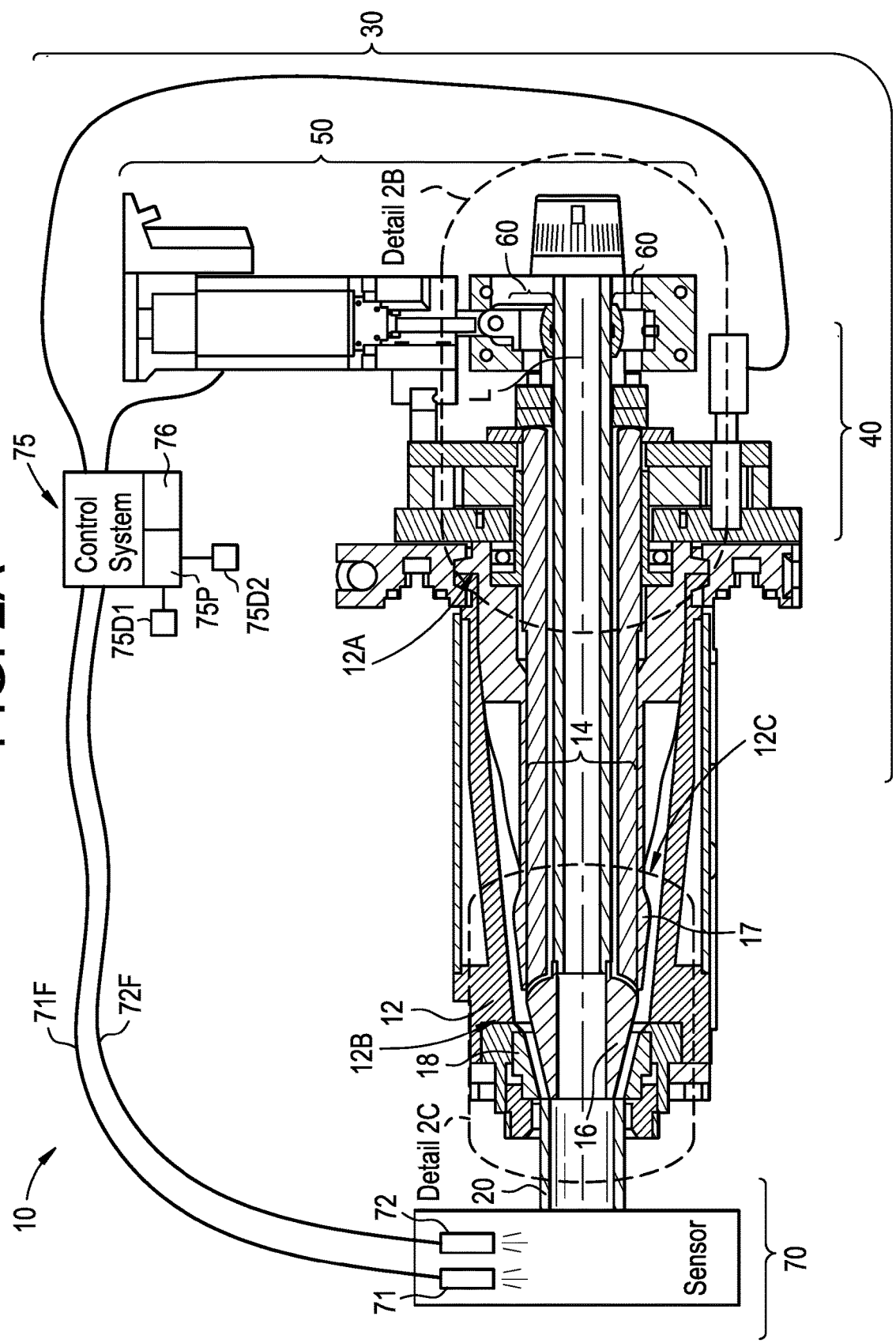
FIG. 2A is a top cross sectional view of the tube forming apparatus of the present invention.

As best shown in FIG. 2A, a tube forming apparatus of the present invention for multi-dimensional controlled forming of polymeric tube is generally designated by the numeral 10. The tube forming apparatus 10 includes a housing 12 that extends around a longitudinal axis L and between a rear end 12A and a discharge end 12B thereof. The housing 12 has an inside surface 12F (best seen in FIG. 2C) that extends between the rear end 12A and the discharge end 12B. The inside surface 12F forms an interior area 12C inside the housing 12. A die 18 is arranged proximate to the discharge end 12B of the housing 12, as described further herein.

As shown in FIG. 2A, the tube forming apparatus 10 includes a core tube assembly 14 that is positioned in the interior area 12C of the housing 12. The tube forming apparatus 10 includes a mandrel 17 that is disposed in the interior area 12C. The mandrel 17 surrounds a portion of the core tube assembly 14 and is fixedly secured to the rear end 12A of the housing 12. A diverter tip 16 is arranged to a portion of the core tube assembly 14, as described further herein. A hollow tube 20 (e.g., having a circular cross section) is shown being discharged from a portion of the die 18 adjacent to the diverter tip 16, as described further herein. While the tube forming apparatus 10 has utility in forming hollow tubes with a circular cross section, the present invention is not limited in this regard as the tube forming apparatus 10 may be employed to form other geometrically shaped products and tubes such as tubes with rectilinear, oval, triangular and star shaped cross sections and tubes with ribs or protrusions thereon.

Figure 2C:
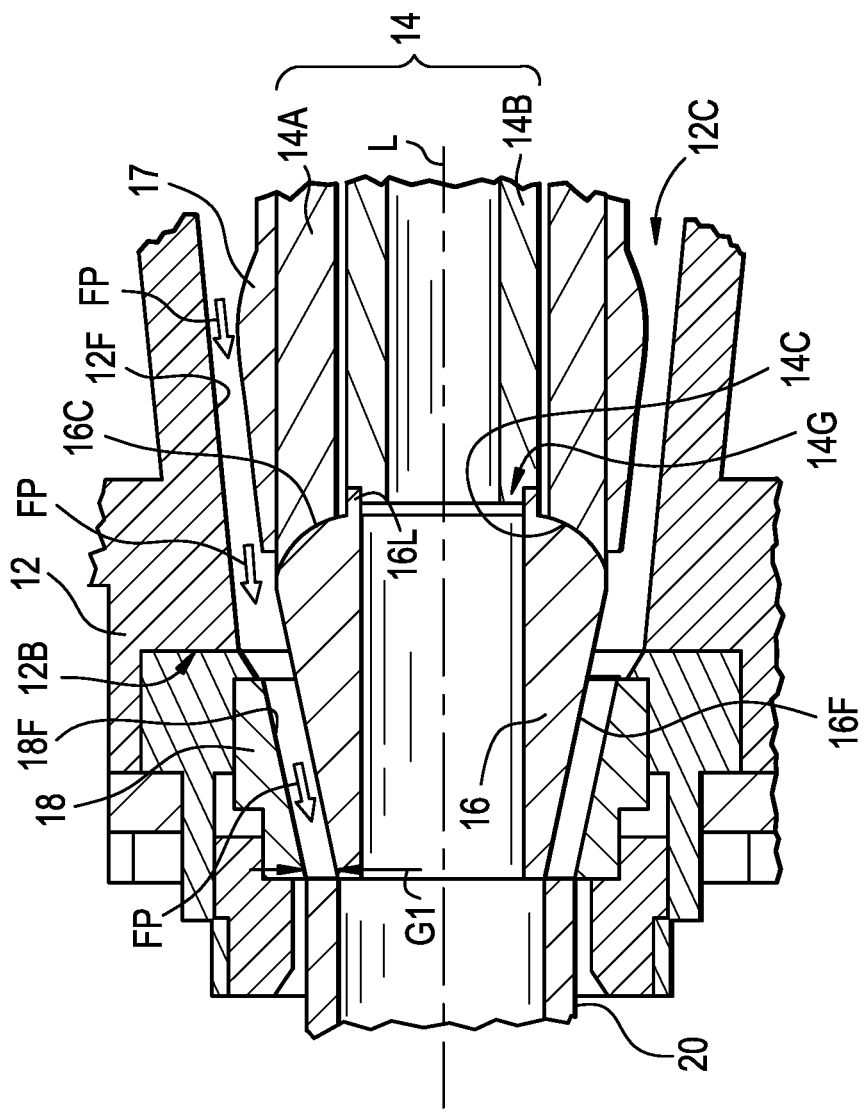
FIG. 2C is an enlarged view of detail 2C of FIG. 2A.

As shown in FIG. 2A, a core tube adjustment system 30 is mounted proximate the rear end 12A of the housing 12. The core tube adjustment system 30 includes: (a) an axial displacement device 40 configured to axially position the core tube assembly 14 for modulating wall thickness of the tube 20 being discharged from the housing 12; and (b) an angular displacement device 50 configured to modulate (e.g., tilt, incline, slant or slope relative to the longitudinal axis L sweeping an angle that forms a conical shaped area) a portion (i.e., an inner core tube 14B, as shown in FIGS. 2B and 2C) of the core tube assembly 14, relative to the longitudinal axis L, as described further herein. The angular displacement device 50 has utility in modulating concentricity of the tube 20 being discharged from the die 18. The angular displacement device 50 includes a bearing 60 that is in communication with a portion of the core tube assembly 14, as described further herein.

As shown in FIG. 2A, the tube forming apparatus 10 includes a control system 75 for automatic control of the thickness, inside diameter, outside diameter and concentricity of the tube 20. The tube forming apparatus 10 includes sensor system 70 that includes: (a) a tube size sensor system 71 configured to measure wall thickness of the tube 20, inside diameter of the tube 20 and/or outside diameter of the tube 20 and to generate tube size signals 71F (e.g., tube wall thickness and diameter signals); and (b) a tube concentricity sensor system 72 configured to measure concentricity of the tube 20 and to generate tube concentricity signals 72F. The control system 75 is in communication with the core tube adjustment system 30 and the sensor system 70. The control system 75 includes a computer processor 75P configured with executable software 76 that includes algorithms that analyze and control the wall thickness and the concentricity of the tube 20. The computer processor 75P is configured to receive the tube size signals 71F and/or the concentricity signals 72F. The executable software 76 is configured to analyze the tube size signals 71F and/or the concentricity signals 72F and is configured to control the tube adjustment system 30 to automatically modulate wall thickness and concentricity of the tube 20. A plurality of displays 75D1, 75D2 (e.g., computer screens, tablet screens, control panel displays, mobile phone displays) are in communication with the computer processor 75P. In some embodiments, the tube size sensor system 71 and/or the tube concentricity sensor system 72 employ X-ray gauges, ultrasound gauges, nuclear gauges and/or other suitable gauges.

Figure 2D:
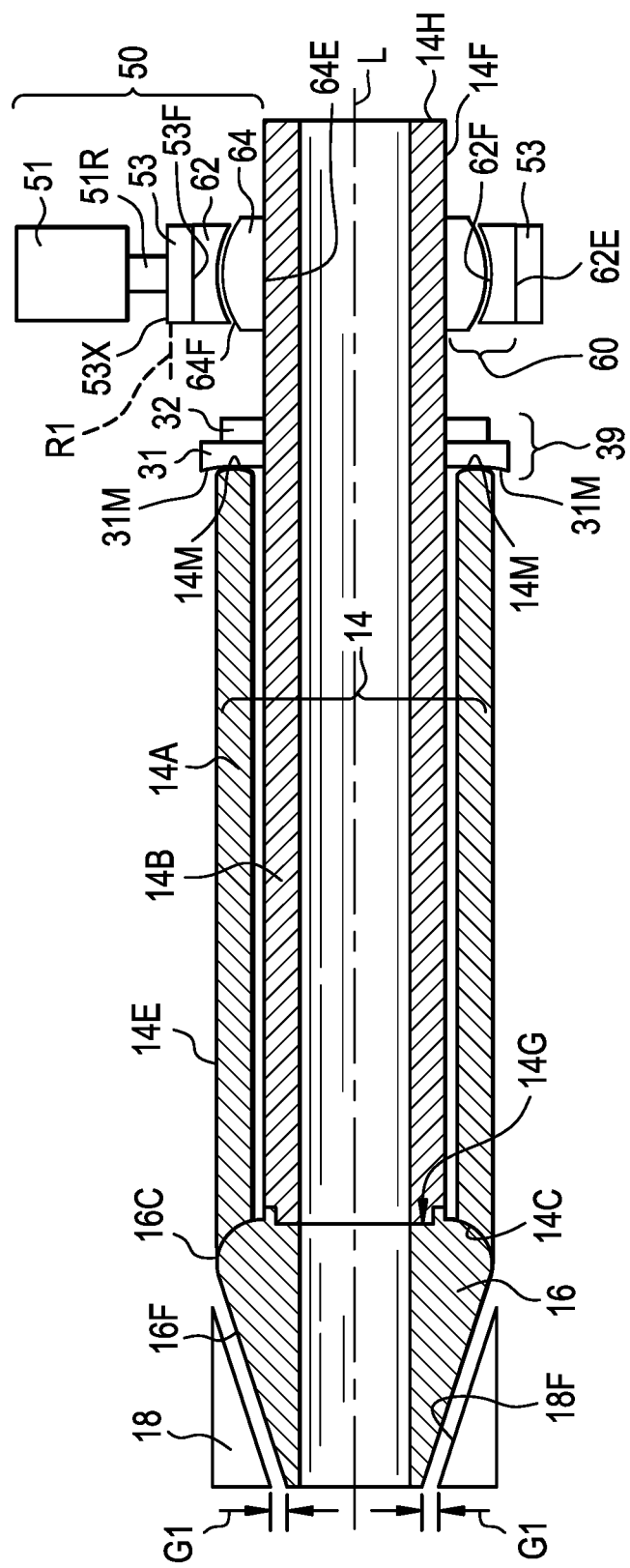
FIG. 2D is a cross sectional view of the core tube assembly of the present invention with an angular displacement device of the present invention attached thereto.

As best shown in FIG. 2D, the core tube assembly 14 includes an exterior core tube 14A with an inner core tube 14B positioned partially therein. The exterior core tube 14A extends between a pivot end 14M and a tip engagement end 14C thereof. The inner core tube 14B has an exterior surface 14F and extends between a first inner tube end 14G and a second inner tube end 14H thereof. The first inner tube end 14G of the inner core tube 14B is disposed in the exterior core tube 14A and the second inner tube end 14H of the inner core tube 14B extends out of the exterior core tube 14A proximate the rear end 12A (see FIG. 2A) of the housing 12 (see FIG. 2A).

As best shown in FIG. 2D, the tube forming apparatus 10 includes the diverter tip 16 mounted in (e.g., threaded into, welded to or secured via another suitable fixed connection) and extending outwardly from the first inner tube end 14G of the inner core tube 14B. The inner core tube 14B is in fixed axial relation to the exterior core tube 14A between the diverter tip 16 and a locking assembly 39. Details of the diverter tip 16 and the locking assembly are described further herein with respect to FIG. 2C and FIG. 2B, respectively.

As best shown in FIG. 2C, the diverter tip 16 has a tapered exterior tip-surface 16F thereon. The tapered exterior tip-surface 16F is generally conical and tapers radially inward from the exterior core tube 14A and axially away from the first inner tube end 14G of the inner core tube 14B. The diverter tip 16 extends into the die 18. The die 18 has an inner die-surface 18F that is generally conical and is complementary in shape to the tapered exterior tip-surface 16F of the diverter tip 16. A die opening G1 is formed between the inner die-surface 18F and the exterior tip-surface 16F.

As best shown in FIG. 2C, the diverter tip 16 includes a convex spherical exterior surface 16C that extends from the diverter tip 16, radially and axially inward toward the inner core tube 14B from a radially outermost portion of the tapered exterior tip surface 16F. The tip engagement end 14C the exterior core tube 14A has a concave spherical engagement surface that is complementary in shape to the convex spherical exterior surface 16C of the diverter tip 16. The convex spherical exterior surface 16C slidingly engages the stationary tip engagement surface 14C of the exterior core tube 14A in response to modulation of the inner core tube 14B relative to the stationary exterior core tube 14A as shown and described further herein with regard to FIG. 2E.

As best shown in FIG. 2C, a flow passage FP is formed between the mandrel 17 and the inside surface 12F of the housing 12. The flow passage FP extends between the tapered exterior tip-surface 16F and the inner die-surface 18F and terminates at the die opening G1 where the tube 20 is formed and is discharged from the tube forming apparatus 10.

As shown in FIG. 2B, the locking assembly 39 includes a bushing 31 and a lock nut 32 that are threaded onto the inner core tube 14B such that the inner core tube 14B engages an axial face 31M of the bushing 31 and the lock nut 32 engages and axially secures the bushing 31 to the inner core tube 14B. The axial face 31M of the bushing 31 has a concave spherical contour and the pivot end 14M of the exterior core tube 14A has a convex spherical contour that is complementary in shape to the concave spherical contour of the axial face 31M of the bushing 31. The axial face 31M is in sliding engagement with the stationary pivot end 14M of the exterior core tube 14A, for example during modulation of the inner core tube 14B caused by the angular displacement device 50 as shown and described further herein with respect to FIG. 2E.

As best shown in FIG. 2B, the axial displacement device 40 includes an L-shaped collar 41 that has a longitudinal leg 41L that extends parallel to the longitudinal axis L and has internal threads 41T (e.g., female threads) formed therein. A radial leg 41R extends radially outward from the longitudinal leg 41L. The L-shaped collar 41 is threaded on to a drive thread 14ET (e.g., an external threaded portion) on the exterior surface 14E of the exterior core tube 14A. A thrust bearing 38 is disposed between the radially leg 41R and the housing 12 to support thrust loads. For example, the thrust bearing 38 is disposed between and engages the radial leg 41R and a cover plate 35A secured to the rear end 12A of the housing 12.

Figure 9:
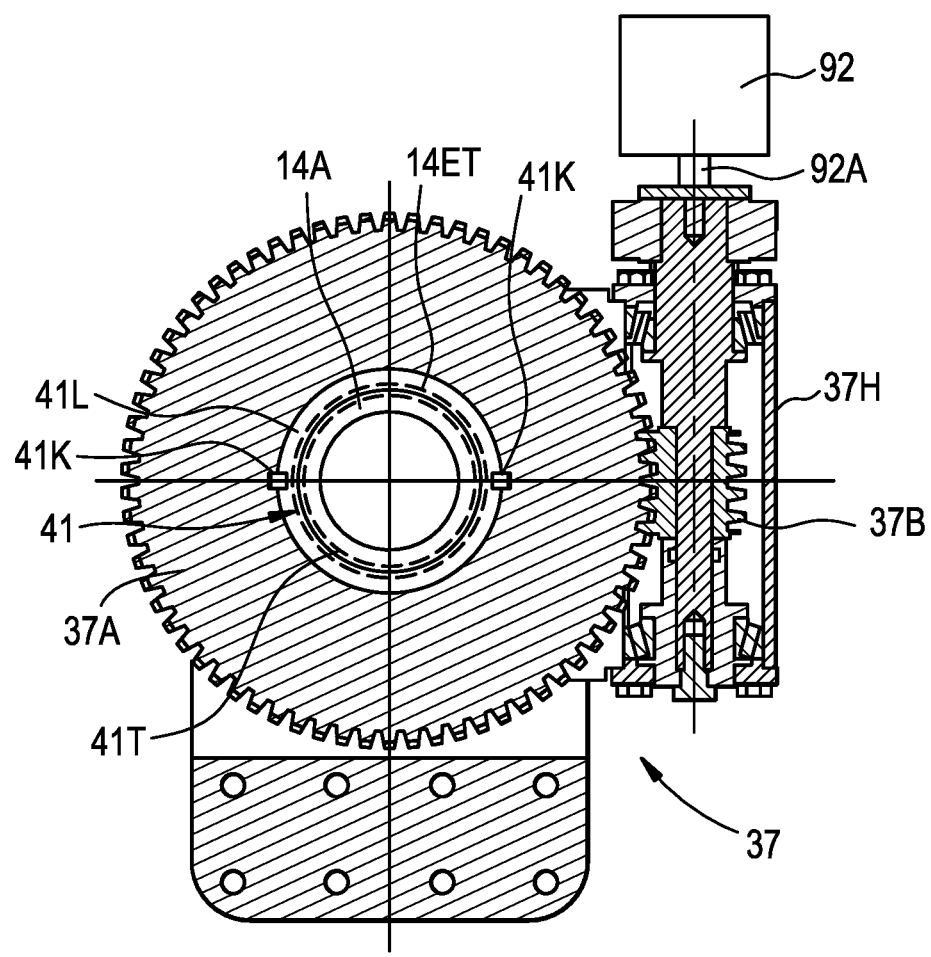
FIG. 9 is a cross sectional view of the axial displacement device for axially moving the core tube assembly.
Figure 10:
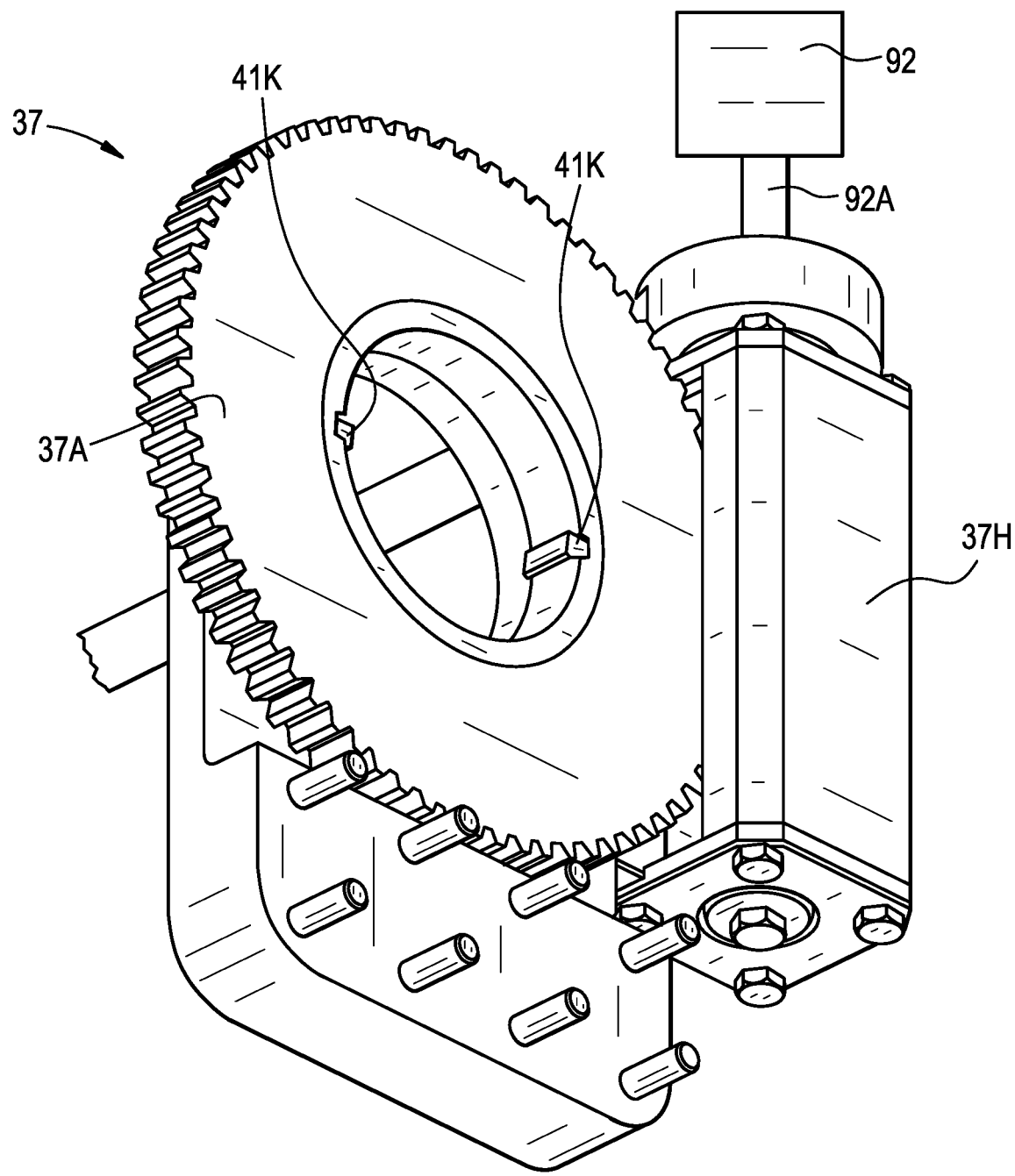
FIG. 10 is a perspective view of the axial displacement device of FIG. 9.

As generally shown in FIG. 2B in full cross sectional view, the axial displacement device 40 includes a drive thread 14ET is formed on the exterior surface 14E of the exterior core tube 14A and a gear arrangement 37 (see FIGS. 9 and 10 for further cross section and perspective views, respectively) is in communication with the drive thread 14ET such that operation of the gear arrangement 37 causes axial movement of the core tube assembly 14. For example, FIG. 9 illustrates the gear arrangement 37 which includes a bull gear 37A (e.g., main gear) that is keyed to the L-shaped collar 41 with keys 41K. Referring back to FIG. 2B, the bull gear 37A is mounted between the cover plate 35A and an end plate 35B. As shown in FIG. 9, the bull gear 37A is driven by a pinion gear 37B that is rotatably mounted in a housing 37H. The pinion gear 37B is rotated by drive shaft 92A of a drive unit 92, such as a servo motor. Rotation of the bull gear 37A causes axial movement of the core tube assembly 14. The axial displacement device 40 is configured to accomplish the axially positioning the core tube assembly 14 during operation of the tube forming apparatus 10.

As shown in FIGS. 2B and 2D, the angular displacement device 50 includes a spherical bearing 60 that has an outer member 62 positioned around an inner member 64. The outer member 62 has a cylindrical outer surface 62E and a concave spherical inner bearing surface 62F. The inner member 64 has convex spherical outer bearing surface 64F and a cylindrical inner surface 64E. The exterior surface 14F of the inner core tube 14B is in axial sliding engagement with the cylindrical inner surface 64E of the inner member 64, for example during adjustment of the axial position of the core tube assembly 14 using the axial displacement device 40 (see FIG. 2B).

Figure 3:
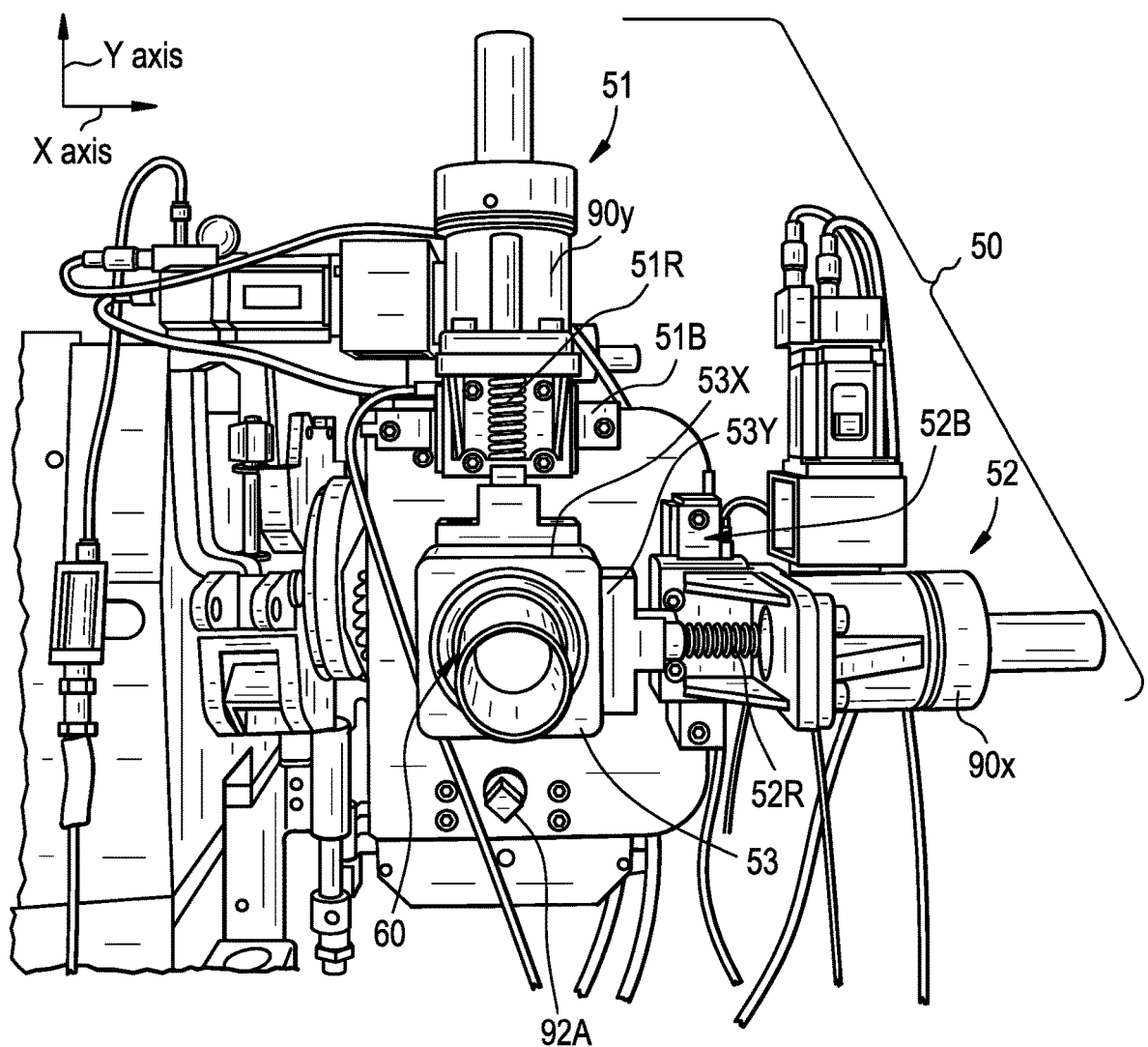
FIG. 3 is a perspective view of the tube forming apparatus of the present invention taken from the rear end of the apparatus and illustrating a core tube adjustment system.
Figure 4A:
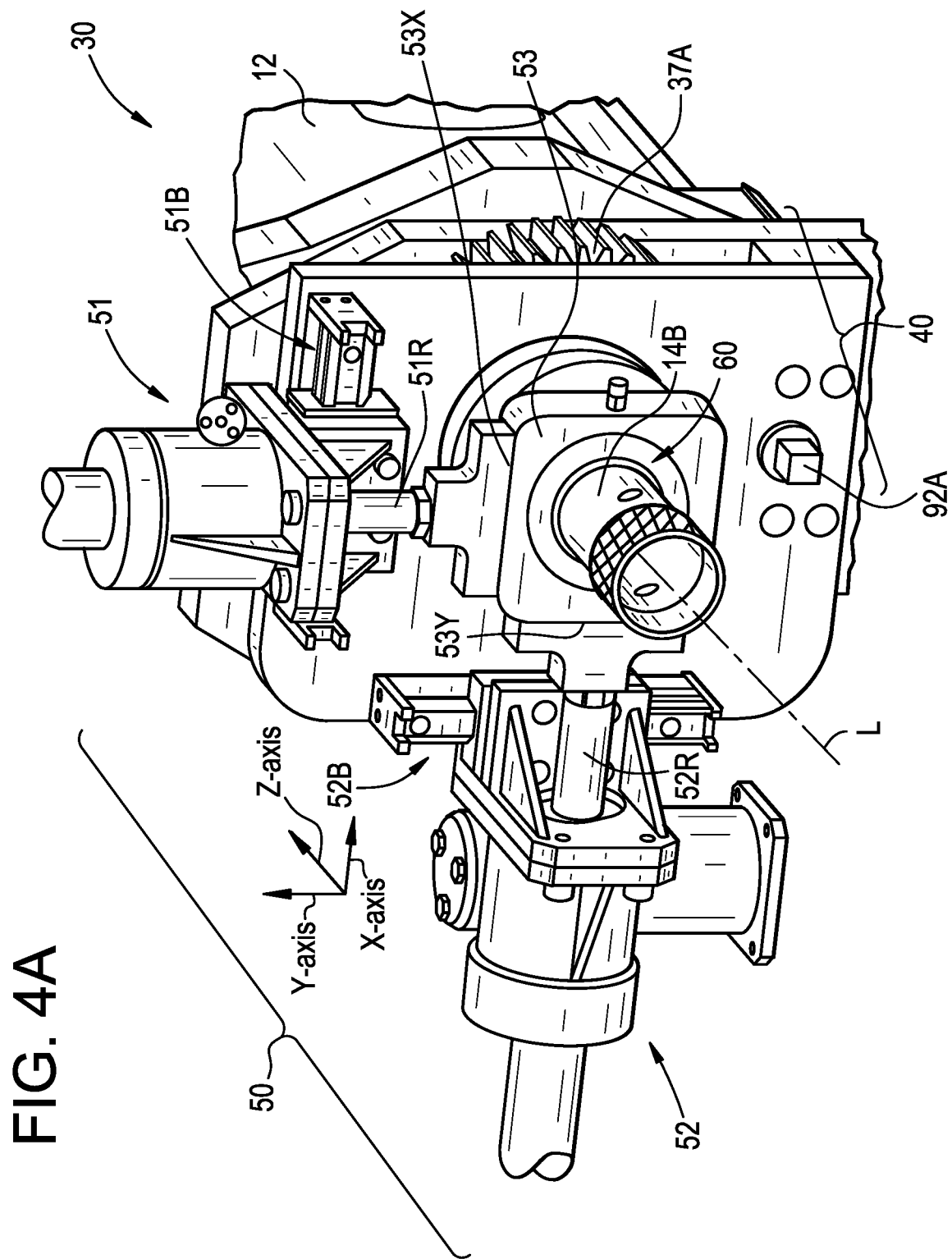
FIG. 4A is another perspective view of the tube forming apparatus of FIG. 3.

As shown in FIGS. 2B, 2D, 3, 4A and 4B, the angular displacement device 50 includes a first actuator 51 that is configured to modulate the inner core tube 14B in a first radial direction (Y-axis). As shown in FIGS. 3, 4A and 4B the angular displacement device 50 includes a second actuator 52 that is configured to modulate the inner core tube 14B in a second radial direction (X-axis) that is perpendicular to the first radial direction (Y-axis), such that cooperation of the first actuator 51 and the second actuator 52 enables modulating of the inner core tube 14B in a wide range of angular directions (e.g., in a conical envelope) relative to the longitudinal axis L.

As best shown in FIG. 4A, the first actuator 51 is in fixed relation to the housing 12 except that the first actuator 51 is moveable relative to the housing 12 in the second radial direction (X-axis); and the second actuator 52 is in fixed relation to the housing 12 except that the second actuator 52 is moveable relative to the housing 12 in the first radial direction (Y-axis).

Figure 2E:
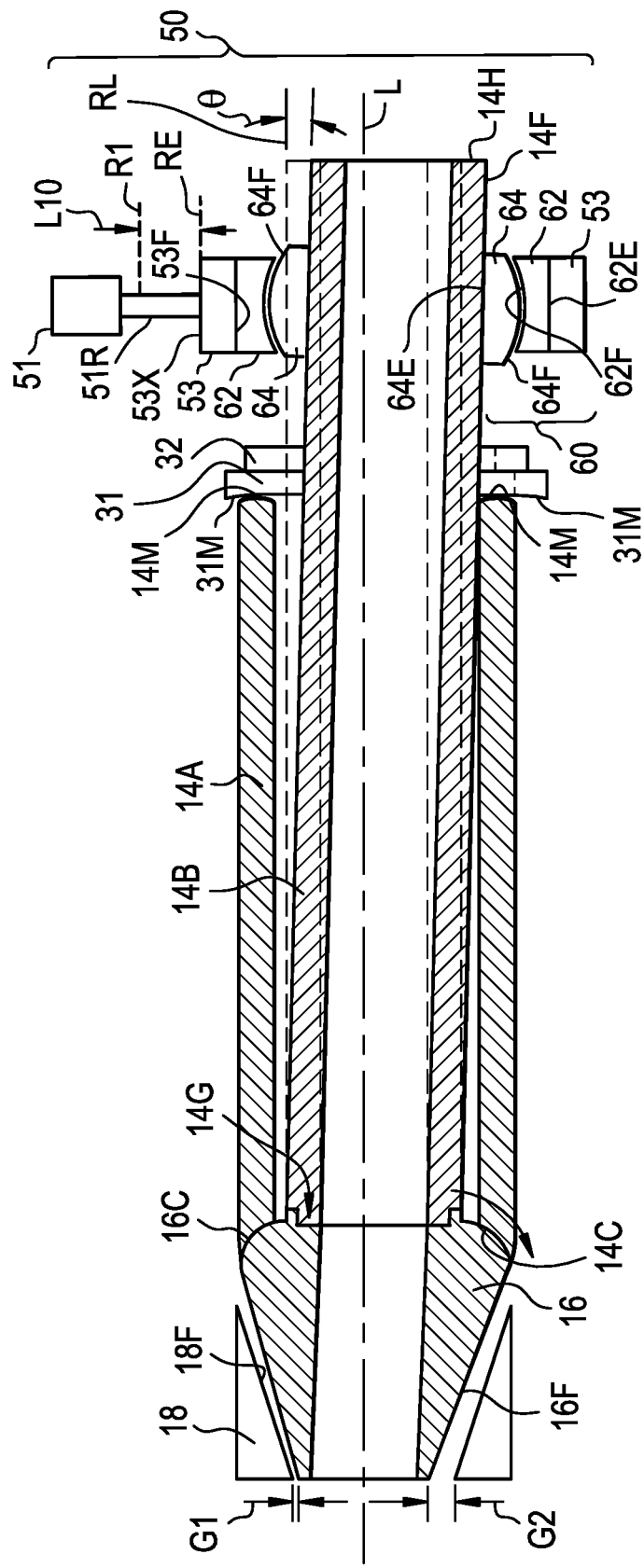
FIG. 2E is a cross sectional view of the core tube assembly of the present invention illustrating the angular displacement device modulating the inner core tube.

As shown in FIG. 3, the first actuator 51 includes a first servo motor 90Y that has an actuator rod 51R that is in engagement with an exterior surface 53X (i.e., on an X-axis plane) of a modulation collar 53. The second actuator 52 includes a second servo motor 90X that has an actuator rod 52R that is in engagement with an exterior surface 53Y (i.e., on a Y-axis plane) of the modulation collar 53. As shown in FIGS. 2B, 2E and 2D, the modulation collar 53 has an interior cylindrical surface 53F that surrounds and engages the cylindrical outer surface 62E of the outer member 62 of the spherical bearing 60.

As shown in FIG. 3, the angular displacement device 50 includes a first linear bearing 51B disposed between the housing 12 (see FIG. 4A) and the first actuator 51 to facilitate movement of the first actuator 51 relative to the housing 12 in the second radial direction (X-axis). A second linear bearing 52B is disposed between the housing 12 (see FIG. 4A) and the second actuator 52 to facilitate movement of the second actuator 52 relative to the housing 12 (see FIG. 4A) in the first radial direction (Y-axis).

As shown in FIG. 2E, the inner core tube 14B is modulatable at an angle $\theta$ of up to 5 degree relative to a reference line RL that is parallel to the longitudinal axis L, for a total included angle of 10 degrees between opposing maximum modulation angles $\theta$ (i.e., the included angle equals 2 times $\theta$). As shown in FIG. 2E, the modulation of the inner core tube 14B over the angle $\theta$ results in adjustment of the diverter tip 16 in the die 18 to adjust the concentricity of the die opening G1. The angular displacement device 50 is configured to accomplish the modulating of the inner core tube 14B from a position axially outward from the rear end 12A of the housing 12 during operation of the tube forming apparatus 10. As shown in FIG. 2D, the core tube assembly 14 is shown in a neutral position with the inner core tube 14B shown coaxial with the exterior core tube 14A and the longitudinal axis L. In the neutral position, the actuator rod 51R is in a position to engage the exterior surface 53X of the modulation collar 53 at a reference line R1. As shown in FIG. 2E, the extension of the actuator rod 51R by a stroke length L10 results in the actuator rod 51R engaging the exterior surface 53X at a reference line RE which is a distance equal to the stroke length L10 away from the reference line R1. The extension of the actuator rod 51R by the stroke length L10 also results in modulation of the inner core tube 14B by the angle $\theta$. The modulation of the inner core tube 14B results in adjustment of the magnitude of the die opening as indicated by element numbers G1 and G2 on FIG. 2E.

In one embodiment, a wear resistant coating is applied to the inner die-surface 18F, the exterior tip-surface 16F and the axial face 31M of the inner bushing 31. In one embodiment, the wear resistant coating is a chromium based material.

In one embodiment, the mandrel assembly 17 has a tapered area configured to facilitate installation and removal of the mandrel assembly 17 to and from the housing 12.

Figure 5A:
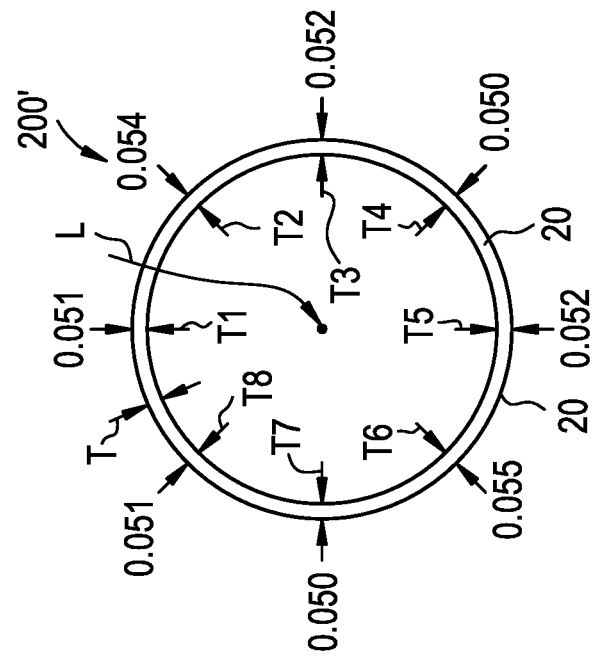
FIG. 5A is a schematic drawing of a computer screen display of tube wall thickness measurements before adjustment.
Figure 5B:
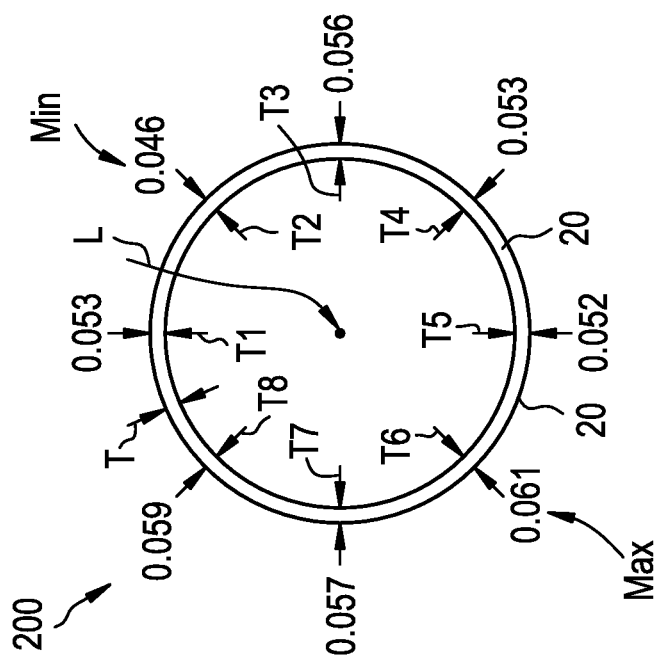
FIG. 5B is a schematic drawing of a computer screen display of tube wall thickness measurements after adjustment.

FIG. 5A illustrates a reproduction of a screen image 200 that appears on one or more of the displays 75D1, 75D2 shown in FIG. 2A. The screen image 200 illustrates the wall thickness of the tube 20 as measured by the tube size sensor system 71 of the sensor system 70 shown in FIG. 2A. The tube size sensor system 71 measures the wall thickness "T" of the tube at eight distinct points T1, T2, T3, T4, T5, T6, T7 and T8, equidistantly spaced around the circumference of the tube 20 discharged from the die opening G1. The tube 20 discharged from the die opening G1 is strung through a gauge (e.g., x-ray gauge, ultrasound gage) to measure the wall thickness at the eight distinct points T1, T2, T3, T4, T5, T6, T7, and T8, for example, during operation of the tube forming apparatus 10. In the embodiment depicted in FIG. 5A, thickness T2 is below a minimum wall thickness set by the user or operator and thickness T6 is above a maximum wall thickness set by the user or operator. A computer processor 75P (shown in FIG. 2A) analyzes the tube wall thickness signals 75F and controls the tube adjustment system 30 to modulate the wall thickness of the tube 20 discharged from the die opening G1. FIG. 5B depicts the screen image 200' illustrating the wall thickness of the tube 20 at the eight distinct points T1, T2, T3, T4, T5, T6, T7 and T8 after the tube adjustment system 30 modulates the wall thickness of the tube 20. The screen image 200' depicted in FIG. 5B shows the thickness measurements at all eight points T1, T2, T3, T4, T5, T6, T7 and T8 are within acceptable ranges.

Figure 6:
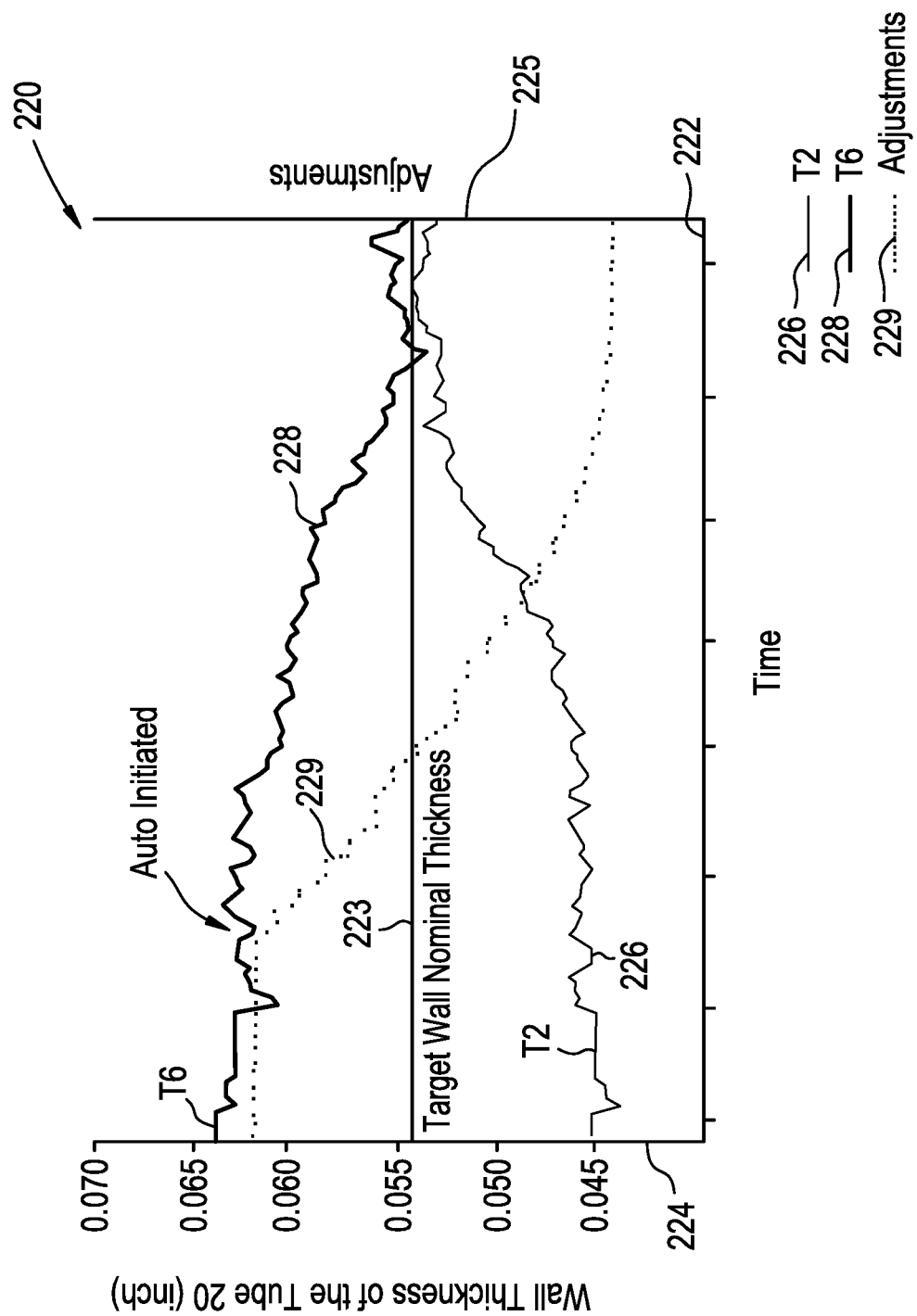
FIG. 6 is a graph showing tube wall thickness and adjustments as a function of time.

FIG. 6 is a graph 220 that depicts the wall thickness T of the tube 20 as a function of time as the tube adjustment system 30 automatically adjusts the thicknesses T of the wall thickness of the tube 20, as discussed herein with reference to FIG. 5A to FIG. 5B. The graph 220 designates time on an X coordinate axis which is designated as element number 222 on the graph 220. The graph 220 designates wall thickness T of the tube 20 on a left side Y coordinate axis which is marked as element number 224 on the graph 220. The graph 220 designates adjustments made by the tube adjustment system 30 (see FIG. 2A) on a right side Y coordinate axis which is marked as element number 225 on the graph 220. While the eight distinct points T1, T2, T3, T4, T5, T6, T7, and T8 are shown and described, the present invention is not limited in this regard as more than eight points or less than eight points may be measured by the sensor system 70.

As shown on the graph 220 in FIG. 6, a plot 228 depicts the wall thickness measurement point T6 as a function of time and a plot 226 depicts the wall thickness measurement point T2 as a function of time, as depicted in FIG. 5A. The graph 220 also includes a plot 229 (depicted as a dotted line in FIG. 6) of the number of adjustments as a function of time. The graph 220 also includes a horizontal line 223 that designates the target nominal wall thickness (e.g., shown in the graph 220 as being about 0.054 inches).

The executable software 76 in the computer processor 75P (see FIG. 2A) automatically initiates adjustments via the tube adjustment system 30 when the wall thickness of the tube 20 exceeds a target wall nominal thickness 223 (see FIG. 6) for a predetermined length of time. The adjustments automatically modulate the thickness of the wall of the tube 20 at measurement point T6 based upon the tube size signals 71F processed by the computer processor 75P decreases, approaching the target wall nominal thickness 223 shown in FIG. 6. As the thickness T of the tube 20 at measurement point T6 decreases, the thickness of the tube 20 at the measurement point T2 increases accordingly. As shown in FIG. 6, both the plot 228 of the thickness of the tube 20 at the measurement point T6 and the plot 226 of the thickness of the tube 20 at measurement point T2 approach the target wall nominal thickness 223 in response to adjustments 229 by the tube adjustment system 30. Referring to FIG. 6, the adjustments 229 are automatically initiated at an appropriate time as marked on the graph 220. The tube adjustment system 30 automatically decreases the thickness of the tube 20 at measurement point T6 and increases the thickness of the tube measurement point T2. Each time the tube adjustment system 30 adjusts the thickness of the tube at measurement points T6 and T2 and the measurements are compared to the target wall nominal thickness 223.

Figure 7:
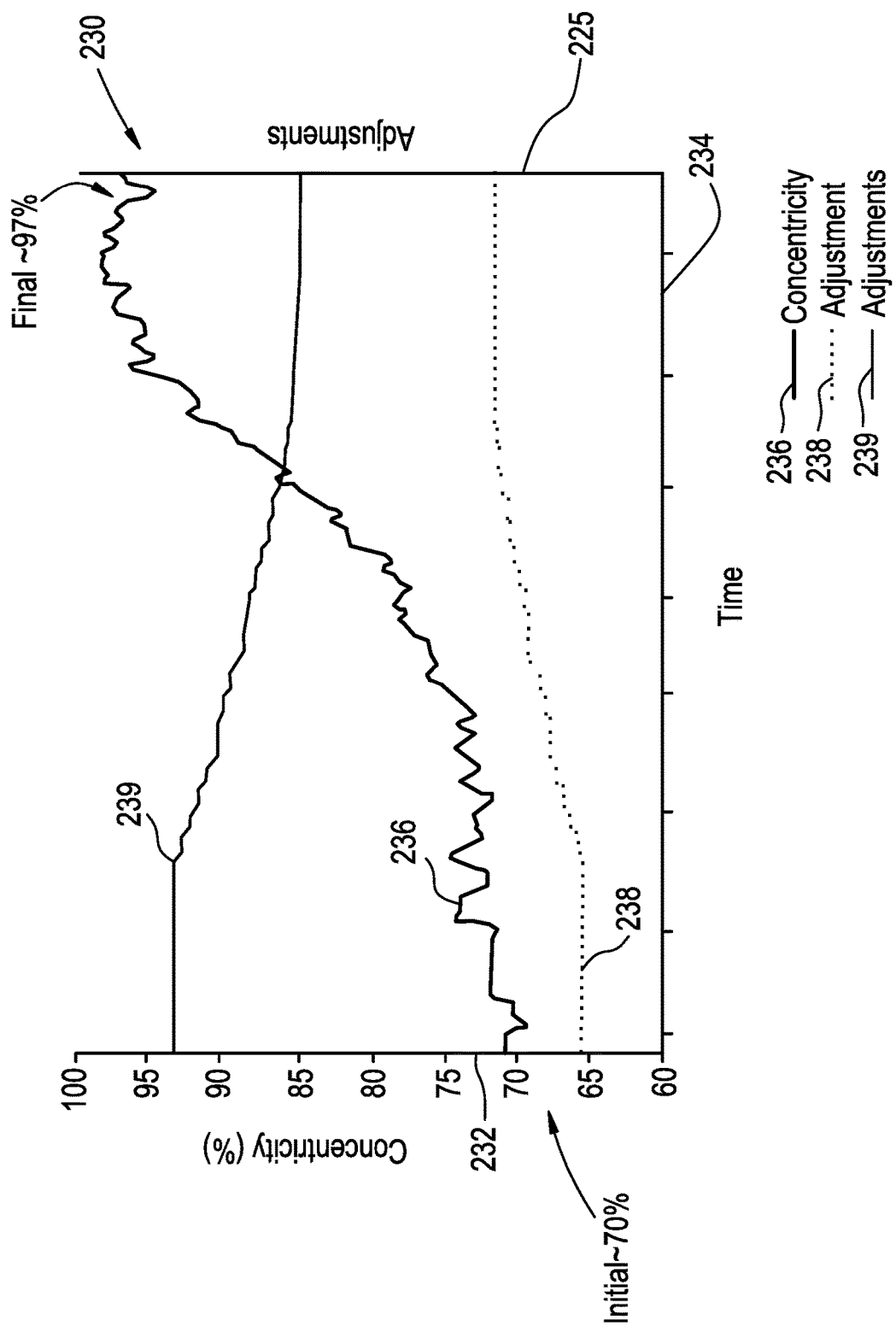
FIG. 7 is a graph showing tube wall concentricity and adjustments as a function of time.

FIG. 7 is a graph 230 that depicts the concentricity of the tube 20 on the left side Y-axis 232 discharged from the die opening G1 over time shown on the X-axis 234. The graph 230 designates adjustments by the motors 90X and 90Y of the angular displacement device 50 (see FIG. 2A) on a right side Y coordinate axis, which is marked as element number 225 on the graph 230.

Referring to FIG. 7, initially the tube 20 discharged from the die opening G1 has a concentricity 236 of approximately 70%, due to the tube thickness being significantly less than the target wall nominal thickness 223 at one thickness measurement point T2 and the tube thickness being significantly greater than the target wall nominal thickness 223 at another thickness measurement point T6. Adjustments by the tube adjustment system 30 result in an increase in concentricity 236 of the tube 20 discharged from the die opening G1. An initial concentricity of around 70-80% is expected. Once the motor adjustment is automatically initiated, an algorithm in the executable software 76 (see FIG. 2A) directs the tube adjustment system 30 (shown generally in FIG. 2A) to adjust the thickness at both points T2, T6 to approach the target wall nominal thickness 223, resulting in a final concentricity 236 of the tube 20 discharged from the die opening G1, of approximately 97%. The automatic adjustment by the computer processor 75P in cooperation with the tube adjustment system 30 maximizes the concentricity 236 of the tube 20 discharged from the die opening G1 and minimizes the eccentricity 237 (depicted in FIG. 8) of the tube 20 discharged from the die opening G1. The computer processor 75P of the tube forming apparatus 10 continues to monitor the thickness and concentricity of the tube 20 discharged from the die opening G1 and continues to send the tube size signals 71F and/or concentricity signals 72F when necessary. The computer processor 75P accounts for variation over as the tube 20 exits the die opening G1, including variation based on day or night limitations, and variations required to correct for gum space adjustment.

Figure 8:
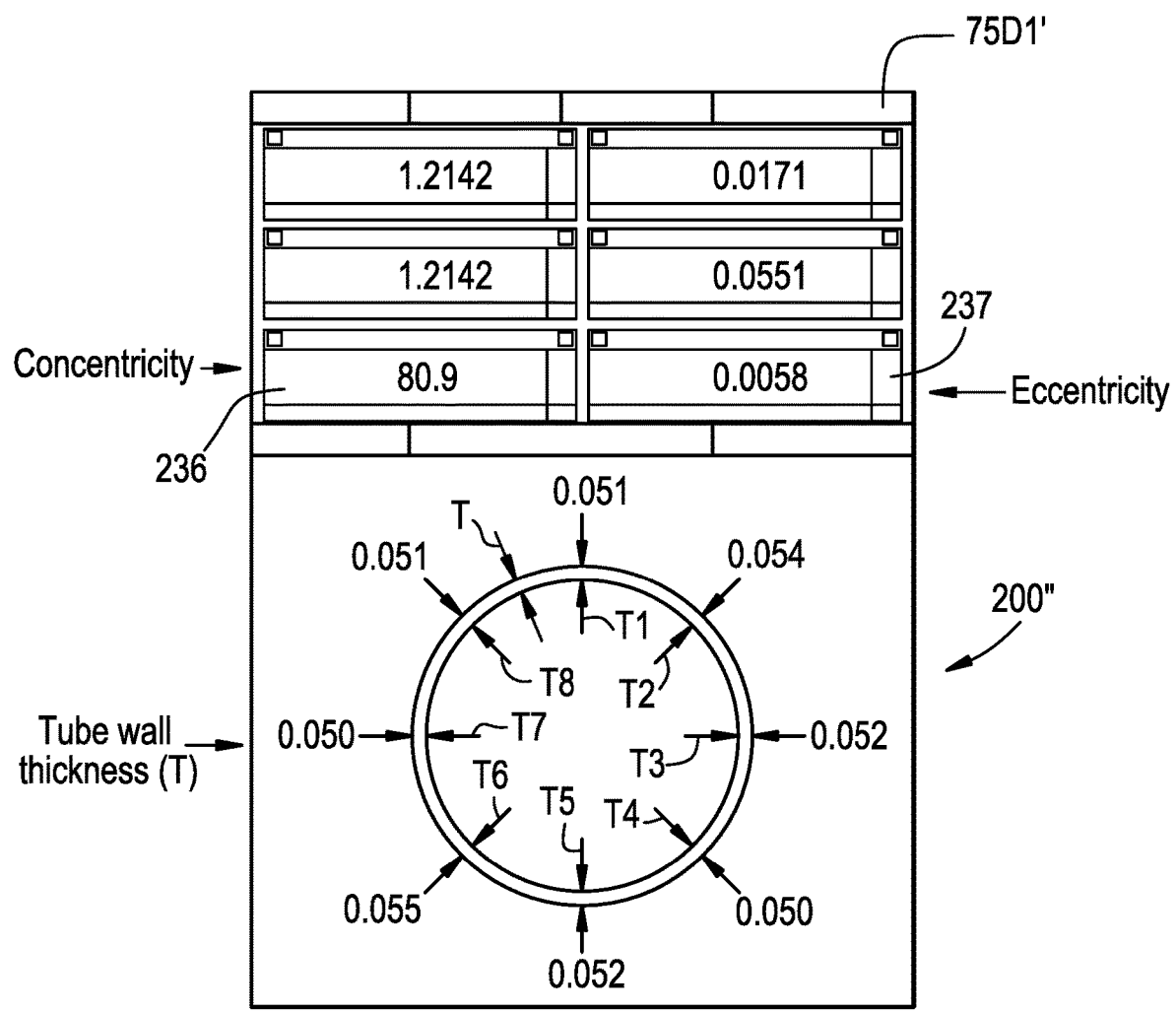
FIG. 8 is a display showing tube wall concentricity, tube wall eccentricity, and tube wall thickness measurements.

FIG. 8 illustrates a reproduction of a representative display 75D1' as shown in FIG. 2A. The depicted display 75D1' has a screen image 200" that illustrates the thickness of the tube 20 as measured by the tube size sensor system 71 of the sensor system 70 shown in FIG. 2A. In the embodiment depicted in FIG. 8, the thickness measurements at all points T1, T2, T3, T4, T5, T6, T7, and T8 are all within an acceptable range. In the depicted embodiment, the computer processor 75P (see FIG. 2A) adjusts the servo motors 90X, 90Y (see FIG. 3) to maintain tube thickness measurements T1, T2, T3, T4, T5, T6, T7, and T8 within the acceptable range of 0.049-0.061 inches, but to increase the concentricity 236 from approximately 80% to 98% with a decrease in eccentricity 237 from 0.06 to 0.005 inches. The representative display 75D1' depicts the thickness measurements at each point, the concentricity 236, and the eccentricity 237 in real time to allow an algorithm contained in the computer processor 75P or a user to adjust the axial displacement device 40 and/or the angular displacement device 50 (as depicted in FIGS. 5A and 5B) to maintain thickness at each point T1, T2, T3, T4, T5, T6, T7, and T8, the concentricity 236 of the tube 20, and/or the eccentricity 237 of the tube within an acceptable range.

Although the present invention has been disclosed and described with reference to certain embodiments thereof, it should be noted that other variations and modifications may be made, and it is intended that the following claims cover the variations and modifications within the true scope of the invention.

What is claimed is:

1. A tube forming apparatus for multi-dimensional controlled forming of a polymeric tube, the tube forming apparatus comprising:
   a housing extending around a longitudinal axis and between a rear end and a discharge end thereof, the housing having an inside surface extending between the rear end and the discharge end, the inside surface forming an interior area inside the housing;
   a core tube assembly comprising:
      (a) an exterior core tube, the exterior core tube extending between a pivot end and a tip engagement end thereof, the exterior core tube extending into the interior area such that the tip engagement end is located proximate the discharge end of the housing and the pivot end is located proximate the rear end of the housing; and
      (b) an inner core tube extending between a first inner tube end and a second inner tube end, the first inner tube end being disposed in the exterior core tube and the second inner tube end extending out of the exterior core tube;
   a die in fixed relation to the housing, the die having an inner die-surface;
   a diverter tip mounted in and extending from the first inner tube end, the diverter tip having an exterior tip-surface thereon and the diverter tip extending into the die such that a die opening is formed between the inner die-surface and the exterior tip-surface; and
   a core tube adjustment system mounted proximate the rear end of the housing, the core tube adjustment system comprising:
      (a) an axial displacement device configured to axially position the core tube assembly for modulating wall thickness of the tube being discharged from the die opening; and
      (b) an angular displacement device configured to modulate the inner core tube, relative to the longitudinal axis, for modulating concentricity of the tube being discharged from the die opening.

2. The tube forming apparatus of claim 1, wherein the core tube adjustment system comprises at least one servo motor.

3. The tube forming apparatus of claim 1, wherein the axial displacement device is configured to accomplish the axially positioning the core tube assembly automatically during operation of the tube forming apparatus.

4. The tube forming apparatus of claim 1, wherein the angular displacement device is configured to accomplish the modulating of the inner core tube automatically during operation of the tube forming apparatus.

5. The tube forming apparatus of claim 1, further comprising:
   a sensor system comprising at least one of:
      (a) a tube size sensor system configured to measure wall thickness of the tube and to generate tube size signals; and
      (b) a tube concentricity sensor system configured to measure concentricity of the tube and to generate tube concentricity signals; and
   a control system in communication with the core tube adjustment system, the control system comprising a computer processor configured with executable software, the computer processor configured to receive at least one of the tube size signals and the concentricity signals, the executable software being configured to analyze at least one of the tube size signals and the concentricity signals and to control the tube adjustment system to automatically modulate at least one of wall thickness and concentricity of the tube.

6. The tube forming apparatus of claim 1, further comprising a thrust bearing in communication with the exterior core tube and the housing to facilitate axially positioning the core tube assembly during operation of the tube forming apparatus.

7. The tube forming apparatus of claim 1, wherein the axial displacement device comprises a drive thread on an exterior surface of the exterior core tube and a gear arrangement in communication with the drive thread such that operation of the gear arrangement causes axial movement of the core tube assembly.

8. The tube forming apparatus of claim 1, wherein the diverter tip comprises a spherical exterior sleeve surface and the tip engagement end of the exterior core tube comprises a spherical inner engagement surface that slidingly engages the exterior sleeve surface in response to modulating of the inner core tube relative to the exterior core tube.

9. The tube forming apparatus of claim 1, further comprising a spherical bearing having an outer member positioned around an inner member, the outer member having a cylindrical outer surface and a spherical inner bearing surface, the inner member having a spherical outer bearing surface and a cylindrical inner surface; and
   an exterior surface of the exterior core tube being in sliding engagement with the cylindrical inner surface of the inner member.

10. The tube forming apparatus of claim 1, wherein the inner core tube is angularly modulatable relative to the exterior tube.

11. The tube forming apparatus of claim 1, wherein the angular displacement device comprises a first actuator that is configured to modulate the inner core tube in a first radial direction and a second actuator that is configured to modulate the inner core tube in a second radial direction that is perpendicular to the first radial direction, such that cooperation of the first actuator and the second actuator enables modulating of the inner core tube around the longitudinal axis.

12. The tube forming apparatus of claim 1, wherein the axial displacement device is configured to axially move the core tube assembly via communication with the exterior core tube.

13. The tube forming apparatus of claim 1, wherein the inner core tube is in fixed axial relation to the exterior core tube via a locking assembly that comprises a bushing and a lock nut that are threaded onto the inner core tube such that the inner core tube is axially fixed between the bushing and a spherical exterior sleeve surface of the diverter tip, and wherein an axial face of the bushing is in angular sliding engagement with the pivot end of the exterior core tube.

14. The tube forming apparatus of claim 13, wherein the axial face has a spherical contour.

15. A core tube assembly for a tube forming apparatus comprising a housing extending around a longitudinal axis and between a rear end and a discharge end thereof, the housing having an inside surface extending between the rear end and the discharge end, the inside surface forming an interior area inside the housing, the core tube assembly comprising:
   an exterior core tube, the exterior core tube extending between a pivot end and a tip engagement end thereof, the exterior core tube extending into the interior area such that the tip engagement end is located proximate the discharge end of the housing and the pivot end is located proximate the rear end of the housing;

an inner core tube extending between a first inner tube end and a second inner tube end, the first inner tube end being disposed in the exterior core tube and the second inner tube end extending out of the exterior core tube;

a diverter tip mounted in and extending from the first inner tube end, the diverter tip having an exterior tip-surface thereon and a spherical exterior sleeve surface extending axially inward from the exterior tip-surface;

the tip engagement end of the exterior core tube comprises a spherical inner engagement surface that slidingly engages the exterior sleeve surface; and the inner core tube is in fixed axial relation to the exterior core tube via a locking assembly that comprises a bushing and a lock nut that are threaded onto the inner core tube such that the inner core tube is axially fixed between the bushing and the spherical exterior sleeve surface of the diverter tip, wherein an axial face of the bushing has a spherical contour and is in angular sliding engagement with the pivot end of the exterior core tube.

* * * * *